Feb. 25, 1969

K. N. HASENBANK 3,429,402

LUBRICATOR

Filed Oct. 7, 1965

INVENTOR.
KENNETH N. HASENBANK

BY

ATTORNEY

United States Patent Office 3,429,402
Patented Feb. 25, 1969

3,429,402
LUBRICATOR
Kenneth N. Hasenbank, Minneapolis, Minn., assignor to Toro Manufacturing Corporation, Minneapolis, Minn., a corporation of Minnesota
Filed Oct. 7, 1965, Ser. No. 493,812
U.S. Cl. 184—103     3 Claims
Int. Cl. F01m *11/12*

---

ABSTRACT OF THE DISCLOSURE

A reserve lubricating system for engine crankcases and the like involving an air tight lubricant reservoir, a passage between the reservoir and the crankcase for the passage of air from the crankcase to the reservoir and the passage of lubricant from the reservoir to the crankcase when the lubricant in the crankcase is below a predetermined level, and a normally closed valve preventing unintentional passage of air and lubricant between the reservoir and crankcase.

---

Figure 1:
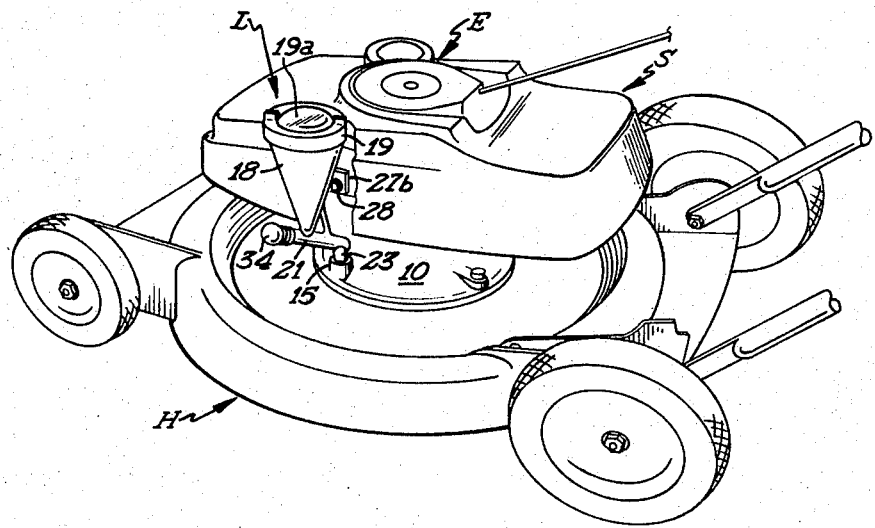

This invention relates to a lubricating system for engine crankcases and the like having a lubricant sump in which it is desirable to maintain a substantially constant predetermined amount of lubricant.

The invention has particular applicability to lawn mowers, to which the following description is directed, but it is to be understood that the invention is not limited to this particular use.

Conventional lawn mowers have no convenient means for readily ascertaining the oil level in the engine crankcase and have no convenient means for readily and quickly refilling the crankcase nor do they carry a reserve oil reservoir from which oil can readily be supplied to the crankcase. In most mowers, the crankcase is provided with a capped inlet opening for adding oil to the sump of the crankcase. The operator is unable to visually observe the oil level in the crankcase unless he removes the refill cap and looks into the sump. If the oil appears low, the operator must then get an oil can and pour oil into the sump until it appears that the sump has been adequately refilled. However, he has no means for accurately determining whether the precise amount of needed oil has been added and in many instances may add too much oil and thereby provide the sump with an undesirable excess of oil. After to its normal storage area before proceeding with the cutting, all of which is inconvenient, time consuming, inaccurate, and somewhat unreliable.

Because of the aforementioned inconvenience involved in determining the oil level and in refilling when necessary, the operator oftentimes does not check the oil as often as necessary, frequently resulting in the oil level falling to dangerously low limits in the crankcase.

Therefore, it is an object of this invention to provide a reserve oil supply system for an oil sump which permits filling, the cap must be replaced and the oil can restored controlled refill of the sump to the desired level without over filling said sump.

Still another object is to provide a reserve oil supply system which enables the operator to readily visually determine when the sump has been refilled to the desired level.

Still another object is to provide a reserve oil system having a normally closed lubricant passageway between the reservoir and the sump to prevent inadvertent addition of oil during use of the machine and thereby prevent the crankcase from being provided with an excess supply of oil.

Still another object is to provide a reserve oil supply system of the type hereinbefore described whereby the crankcase can be filled directly through the oil reservoir and wherein the reservoir can be readily refilled without dismounting or removing same.

Still another object is to provide a reserve oil system of the type described in which the capacity of the oil reservoir is predeterminately related to the capacity of the oil sump so that the reservoir can function as a measuring device when initially filling an empty crankcase.

Figure 2:
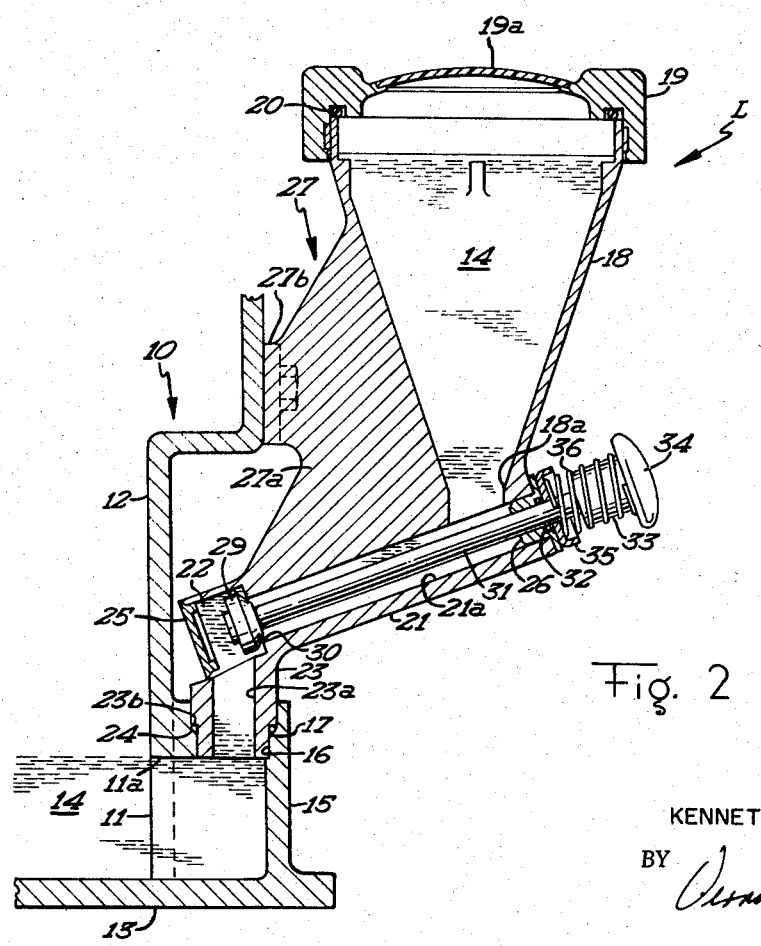

These and other objects and advantages of the invention will be more fully understood from the following description made in connection with the accompanying drawings wherein like character references refer to the same part throughout the several views and in which:

FIGURE 1 is a perspective view of a rotary lawn mower having a reserve oiling unit of this invention mounted thereon and FIGURE 2 is an enlarged vertical sectional view of the reserve oiling unit of FIGURE 1.

Referring to the drawings, a conventional rotary mower is shown having a reserve lubricating unit L mounted thereon. The mower includes a cutter housing H on top of which is mounted a gasoline engine E, which engine is covered by a shroud S.

The engine includes a crankcase 10, the lower part of which serves as the oil sump, said crankcase having an opening 11 formed in the side wall 12 of the case adjacent the base 13 of the case. The upper edge or limit 11a of the opening 11 represent the desired level for the oil 14. The crankcase has a cylindrical well 15 which communicates with the sump and in effect forms a part or extension thereof and which communicates with the main part of the crankcase through the opening 11. The well has an upwardly facing opening 16 which is provided with an annular shoulder 17. The illustrated crankcase and well therefor is a common design on many conventional engines, the opening in said well serving as the means for adding oil to the crankcase, said well being normally capped on conventional engines. In the present embodiment, the well cap is dispensed with, and the reserve lubricating unit L is mounted on the mower so as to communicate with said well and supply oil thereto.

The reserve lubricating unit L includes a conically shaped oil reservoir or tank 18 having a cap 19 for closing the top thereof, a sealing ring 20 being provided between the cap and the reservoir to pneumatically seal the interior of the reservoir or tank when the cap is mounted thereon. At least the mid-portion 19a of the cap is transparent so as to serve as a window through which the surface of the lubricant in the reservoir can be observed to determine when the sump has been filled to the desired level, and so that the reservoir interior can be readily observed without removing the cap to determine when the reservoir needs replenishing. The lower end of the tank 18 terminates in a discharge opening 18a which communicates with the bore 21a of an elongate tube 21 which is attached to the tank and which is inclined downwardly therefrom towards the crankcase and its well 15. The lower end of tube 21 has an enlarged chamber 22 which communicates with the vertical bore 23a of the vertical tube 23 which depends from the lower end of the tube 21. The tube 23 has a reduced lower portion defining a shoulder 23b which seats on the shoulder 17 of the well socket when the tube is inserted therein as illustrated, a sealing ring 24 being interposed between the shoulders 17 and 23b to make an airtight connection between tube 23 and the well 15, the tube 23 engaging the socket of the well in close fitting sliding relationship therewith.

The lower end of the tube 21 and the lower enlarged chamber 22 thereof are closed and sealed by means of a plug 25.

The upper end of tube 21 is closed and pneumatically sealed by a plug 26. Thus, the reserve oil is housed in and passes through a closed pneumatically sealed airtight system to the sump, the oil passing from the tank 18 downwardly through the discharge opening 18a thereof into the tube 21 through bore 21a thereof and thence through the chamber 22, the bore 23a of tube 23 and into the well 15, from whence the oil passes through the opening 11 into the crankcase.

The tank and its associated components is securely attached to the crankcase by means of a bracket 27 which includes a web portion 27a which is secured to and extends laterally from the tank 18, and which further includes a flange 27b which abuts with the side wall 12 of the crankcase and which is fastened thereto by any suitable fastening means such as the cap screw 28.

Because of the completely closed system, oil cannot pass from the reservoir to the sump unless and until the oil level drops below the upper limit 11a of the sump inlet opening so as to permit air from the crankcase to escape therefrom through the tubes 21 and 23 to the reservoir, the air bubbling upwardly through the oil in the reservoir until it reaches the open space between the lubricant surface and the cap 19 to thereby release oil from the reservoir to supply the sump. So long as the oil level is below the upper limit 11a of the sump inlet opening, air will continue to escape from the crankcase to the resrvoir and will continue to release the oil from the reservoir to supply the sump until the oil level reaches the upper limit 11a at which time air can no longer escape from the crankcase and oil will no longer pass from the reservoir to the sump.

However, during use, the oil does not remain stationary in the crankcase and moves about therein so that the oil level thereof is not constant such as when the machine is jolted or tilted so that during use, even when the proper amount of oil is in the crankcase, the opening 11 is repeatedly unsealed by the movement of the oil which would result in unintentional filling of the crankcase during use if the passage between the reservoir and the sump were open, which filling would normally result in the crankcase receiving an oversupply of oil.

Therefore, to prevent unintentional filling and the undesirable results of over supplying, normally closed valve means are provided which are interposed between the lubricant supply and the sump for preventing the unintentional passage of oil from the reservoir to the sump while the mower is being used.

In the illustrated embodiment, the valve means comprise a circular rearwardly tapered valve member 29 disposed in the chamber 22, said valve member being adapted to engage and seat against an annular valve seat 30 formed or provided by the shoulder between the bore 21a and the enlarged chamber 22. The valve member is provided with a stem 31 which extends longitudinally of the tube 21 through the entire length, so as to emerge from the upper end thereof after passing through the apertured plug 26, sealing ring 32 being seated in an annular groove in the outer face of said plug and extending outwardly therefrom when uncompressed and interposed between the valve stem and the plug 26 to provide a pneumatic seal therewith. The upper end portion of the valve stem located outside tube 21 is attached to the cylindrical shank portion 33 of an operating knob 34. A cupped spring receiving collar 35 is provided which bears against the outer end of plug 26 and compresses sealing ring 32 and holds same in sealed relationship with said stem and plug. A helically coiled spring 36 encloses the upper end portion of the valve stem and the enlarged head thereof, one end of the spring bearing against said collar 35, the other end of the spring bearing against the knob 34 so as to continuously bias or urge the operating knob and the valve stem outwardly into a retracted position, and to continuously bias the valve member towards closed sealing engagement with its valve seat so as to normally close the tube 21 and the passageway between the reservoir and the soil sump so as to prevent unintentional passage of oil from the reservoir to the sump during use. Thus, the valve carrying mechanism is in effect a spring biased plunger which normally holds the valve member against its valve seat. To open the passageway between the reservoir and the sump, the operator need only press against the operating knob and push same inwardly, thereby unseating the valve member from its seat and opening the passageway between the reservoir and the sump. If the oil is below the desired level 11a, air will escape from the crankcase to the reservoir and oil will pass from the resrvoir to the sump until the oil level has been raised again to 11a, at which time air will cease to escape from the crankcase and the reservoir will no longer supply oil thereto due to the pressure differential between the crankcase and the reservoir caused by the negative pressure or partial vacuum in the reservoir.

As the air escapes from the crankcase to the reservoir, it passes upwardly through the lubricant in the form of bubbles and ultimately emerges from the lubricant surface to the open space underneath the cap 19. The air bubbles provide visual means by which it can be readily determined whether the sump is receiving oil from the reservoir. That is, as long as the air bubbles pass through the lubricant in the reservoir, it is apparent to the operator that the oil level is below the desired limit 11a and that he should continue to keep valve 29 open to continue the addition of oil. When the air bubbles cease, this is an indication to the operator that the oil level has reached the desired limit 11a, and that he should release the plunger to permit it to return the valve to closed seated position. Because of the turbidity of the oil, it is usually difficult to observe the movement of the air bubbles through the oil body, and the presence of the air bubbles can be best observed and ascertained at the surface of the lubricant where the air bubbles can be readily seen breaking the surface thereof. Therefore, in the illustrated embodiment, the window 19a is provided through which the operator can observe the oil surface and determine whether any air bubbles are entering the oil reservoir, when the valve is open.

Thus, the operator can conveniently at any time determine whether the crankcase needs oil by simply depressing the knob 34, and opening the valve and looking through the window 19a. If he sees air bubbles breaking the oil surface in the reservoir, he knowns that the crankcase needs oil and can continue to depress the knob and keep the valve open until the air bubbles cease, at which time he knows that the refilling has been completed to the desired level and he can release the knob and close the valve. If, when he initially depresses the knob, no air bubbles appear, when he knows that the crankcase is not in need of oil, and he can then immediately release the knob and reclose the valve.

The valve, when closed, enables the reservoir to be refilled without adding excess oil to the crankcase. The illustrated embodiment also enables the reservoir to be refilled without dismounting same, said refilling being accomplished simply by removing the cap 19.

Also, the illustrated embodiment enables the empty crankcase to be initially conveniently filled directly through the reservoir. In one preferred embodiment, the capacity of the reservoir is predeterminedly related to the desired capacity of the sump so that the reservoir can be used as a measuring device when initially filling the empty crankcase. Thus, in one preferred embodiment, the capacity of the reservoir is one-fourth that of the oil sump. The operating instructions for the machine can then tell the operator that he must initially fill the reservoil four times to initially fill the crankcase to the proper level, after which he may again fill the reservoir for a fifth time, the fifth filling serving as the reserve oil supply.

It will be noted that in the illustrated embodiment, the air and the oil move through a common passageway in traveling between the sump and the reservoir. In such a situation, care must be taken in designing the system to prevent entrapment of air and the development of an airlock in the system which will block the passageway and prevent the movement of air and oil between the reservoir and the sump even though the valve is open. To avoid the development of such an airlock, the illustrated system is so designed that the air moves continuously upwardly in its travel from the sump to the reservoir and never moves downwardly or horizontally during travel. In the illustrated embodiment, where a common oil-air passage is provided, best results are achieved when the tube 21 is inclined at an angle of at least 15 degrees above the horizontal.

Thus, it is apparent that the invention provides a very convenient easily operable reserve lubricating system mounted directly on the mower in direct communication with the oil sump and which provides for controlled accurate refill of the crankcase to the exact level desired and prevents any chance of over filling the crankcase either during filling or during use and which provides conveniently visually observable means for ascertaining whether the crankcase needs oil or not, and when the filling operation has been completed.

It will, of course, be understood that various changes may be made in the form, details, arrangement and proportions of the various parts without departing from the scope of my invention.

What is claimed is:

1. In combination, a casing having an upwardly facing lubricant inlet opening, a hermetically sealed lubricant reservoir disposed above and laterally offset from said inlet opening and having a discharge opening formed in the bottom thereof, duct means connecting said discharge opening with said inlet opening and operating as a common passageway for the passage of air and lubricant between said casing and said reservoir, said duct means including an elongate downwardly inclined section having the upper end portion thereof in communication with said discharge opening of said reservoir and a vertical section depending from the lower end portion of the aforementioned inclined section and communicating with said inlet opening, a valve seat formed in the lower end of said inclined section, a valve member adapted to engage said seat and close said duct means, valve actuating means comprising an elongate rod telescopically and reciprocatably mounted in said inclined section, the lower end of said rod being operatively connected to said valve member, the upper end of said rod being disposed outwardly of said inclined section and provided with manually engageable means which is adapted to be manually engaged to position said rod to open said valve member without breaking said seal in said reservoir, spring means connected to said rod and continuously biasing said valve member towards duct closing engagement with said valve seat.

2. The combination of claim 1, wherein said vertical section is of less length than said inclined section.

3. The combination of claim 1, wherein said spring means is connected to the upper end of said rod for retracting the rod after manual operation thereof to open the valve.

References Cited

UNITED STATES PATENTS 2,275,915  3/1942  McDonald _____ 136—162.410

FOREIGN PATENTS 535,871  2/1922  France.
541,349  5/1922  France.

SAMUEL ROTHBERG, *Primary Examiner.*

E. J. EARLS, *Assistant Examiner.*

U.S. Cl. X.R.

137—454